United States Patent [19]
Gardner

[11] Patent Number: 5,782,588
[45] Date of Patent: Jul. 21, 1998

[54] DRAW BAR ASSISTED ROTARY HOLE SAWING

[76] Inventor: Dale W. Gardner, 12680 Herring Rd.. Colorado Springs, Colo. 80908

[21] Appl. No.: 670,065

[22] Filed: Jun. 25, 1996

[51] Int. Cl.⁶ ..................................................... B23B 45/14
[52] U.S. Cl. ........................... 408/80; 408/101; 408/120; 408/137; 408/204
[58] Field of Search ............................ 408/79, 80, 101, 408/102, 111, 121, 120, 137, 138, 204, 703

[56] References Cited

U.S. PATENT DOCUMENTS

| | | | |
|---|---|---|---|
| 1,435,502 | 11/1922 | Sager | 408/101 |
| 1,590,994 | 6/1926 | Misener | 408/204 |
| 2,777,341 | 1/1957 | Marchant | 408/80 |
| 2,815,569 | 12/1957 | Powers . | |
| 4,380,990 | 4/1983 | Giardini | 408/204 |

FOREIGN PATENT DOCUMENTS

| | | | |
|---|---|---|---|
| 26096 | 2/1884 | Germany | 408/80 |
| 1959727 | 9/1971 | Germany | 408/80 |

Primary Examiner—Daniel W. Howell

[57] ABSTRACT

Improved, draw bar assisted, rotary hole sawing apparatus that provides the versatility and methods required whereby operator ingenuity can achieve a set up to accomplish the required hole sawing or similar type machine operation in a wide variety of positions, conditions and situations. The design provides for applying rotational force from either the cutter side or opposite side of the device, and can be applied by hand power or with power tools. Provision is made, with a backing plate, to facilitate sawing very thin materials and to increase stability. The setup can be arranged so that draw bar pressure can be applied from either end of the device. Provision is made so that compensating force can readily and constantly be applied to resist the side force which tilts the tool axis relative to the work piece as a result of the secondary force introduced by the ratchet type method of rotating the cutter. Included in the design is a draw bar thrust nut handle of a shape and size that allows the operator to increase cutter pressure by gripping the handle as it rotates with a slipping friction to controllably tighten it. A lever bar embodiment allows operator to increase and decrease cutter pressure as desired when such control is required.

8 Claims, 6 Drawing Sheets

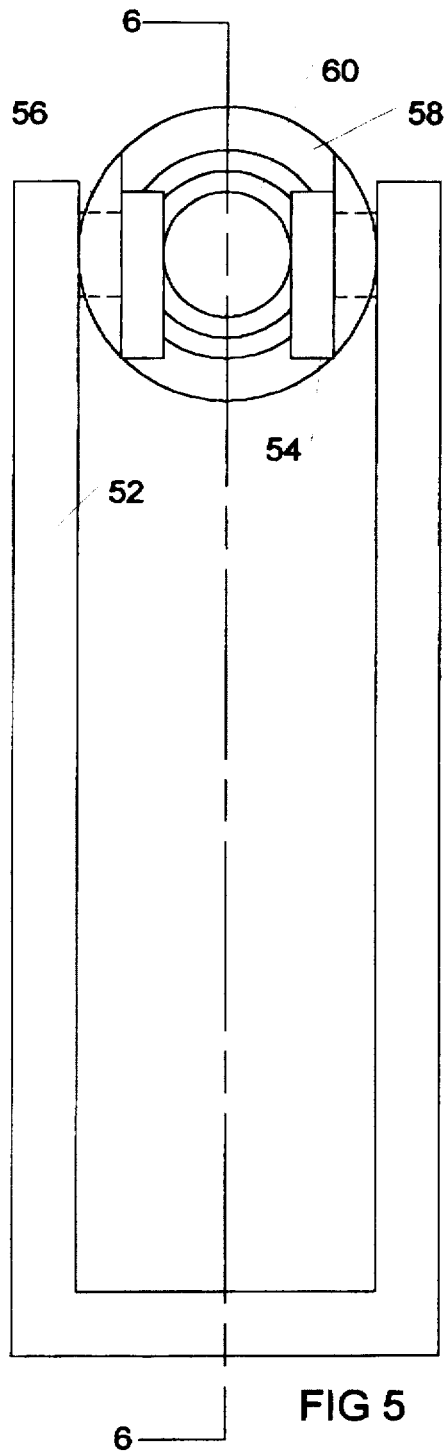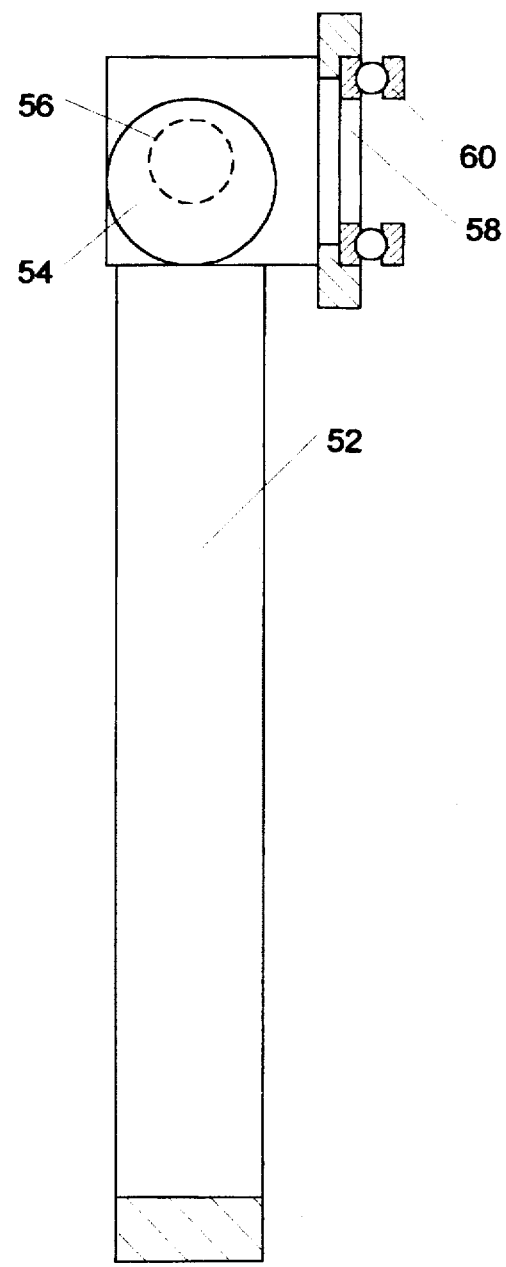
FIG 5
FIG 6

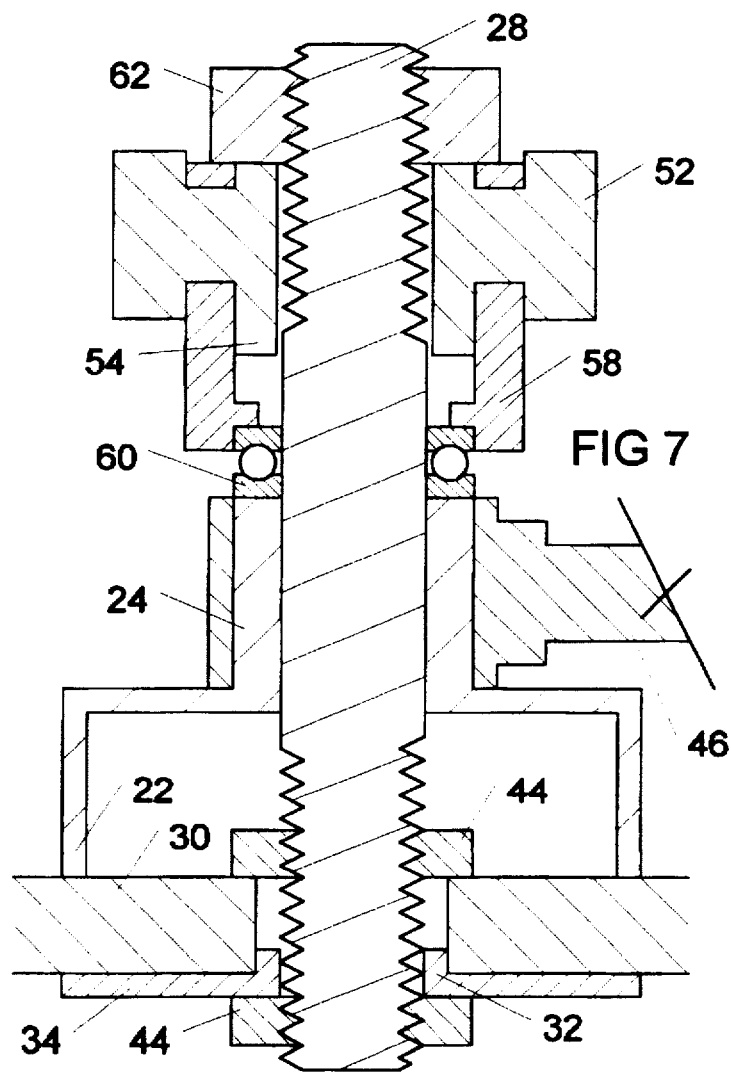

DRAW BAR ASSISTED ROTARY HOLE SAWING

BACKGROUND/FIELD OF INVENTION

This invention relates to hole sawing, specifically to improvements for draw bar assisted rotary hole sawing and similar operations such as trepanning, boring, counter boring, spot facing, etc.

BACKGROUND/DISCUSSION OF PRIOR ART

Beginning in the 1800's, many U.S. patents have been issued for hole sawing methods and equipment. At present, hole sawing is highly developed and refined for large machine tool operations such as are used in factories. The success of this type of operation is a result of the high degree of stability and control provided by non-portable machine tools. These machines do not require draw bars for hole sawing because they have inherent capability to push the saw thru the table mounted work piece.

Hole sawing is also a frequent requirement in industries such as construction, maintenance, assembly and similar areas. Most hole sawing performed today, in field type situations, is accomplished with portable power drills. These operations are usually achieved by the operator holding the power drill in his hands, thus attempting to provide the support, stability, control and pressure required. The cutting tool has a tendency to catch, for lack of stability, and this often results in injury to the operator and damage to the hole saw, the arbor, the power drill and even the work piece.

A number of patents have been issued showing equipment using a draw bar to pull the rotating hole saw thru the work. To the best of my knowledge, the drawbar method has never become successful and available to industries such as construction, maintenance and assembly. I believe the reason for this, as determined by experimentation, is that the prior art did not teach how to build draw bar type hole sawing equipment that provides the required combination of stability, control and versatility for successful hole sawing with portable equipment in field conditions.

All of the prior art, as far as I have determined, tightens the draw bar from the cutter side of the work. This is very limiting when job conditions require the provision to tighten the draw bar from the opposite side. Almost all of the prior art was designed to be rotated with a hand ratchet handle. The force produced by this drive method includes a force vector that causes the draw bar to lay over from the desired right angle axis position to the work piece. This causes tool grabbing and also causes the cutter to saw thru the work at an angle, which makes it difficult to finish sawing the hole as it breaks thru, and on thin materials it sometimes becomes impossible to finish the operation because the teeth of the saw hang up on the cresent section of the unfinished cut.

The prior art is very limited for draw bar assisted hole sawing, and even more limited for portable powered draw bar sawing. U.S. Pat. No. 2,815,569—Powers—1957 is an example of such a device. However it is designed for a very limited application, has little versatility, makes provision for the rotational forces to be applied only on the side opposite of the cutter, and requires a key slot in the drawbar with the resultant associated operational complications, increased costs and short life.

OBJECTS AND ADVANTAGES

Accordingly, my drawbar assisted rotary hole sawing apparatus invention includes the following objects and advantages. It is versatile and readily adaptable to various field conditions and requirements. Provision is made to successfully saw holes in materials ranging from very thin to very thick. Included is a design that enables the drawbar to be tightened from either side of the work piece. Provisions are made so that the device can be driven by hand or with power tools. Methods are included to resist the secondary force, introduced by rotating the saw by hand with a ratchet type handle or similar power drive, that causes the axis of the tool to tilt with the result that the hole saw breaks thru the work piece at an angle.

These improvements include numerous advantages and will alleviate the problem of limited versatility associated with the prior art. They will make it convenient to saw holes in material ranging from thin to thick. The operator may use his ingenuity to achieve the required set up for the job at hand. The apparatus provides great convenience in that it can be rotated by hand or with power tools. Provision is made to resist the forces that cause the hole saw to break thru the work piece at an angle. These advantages will allow portable draw bar assisted hole sawing to become a desirable method for producing holes in construction, maintenance, assembly, and similar industries.

Further objects and advantages of my invention will become apparent from a consideration of the drawings and ensuing description.

DESCRIPTION OF DRAWINGS

FIGS. 5 & 6 are top and side views of a draw bar lever assembly of my invention.

FIG. 7 is a side view of an embodiment of the invention using a draw bar lever assembly.

Figure 1:
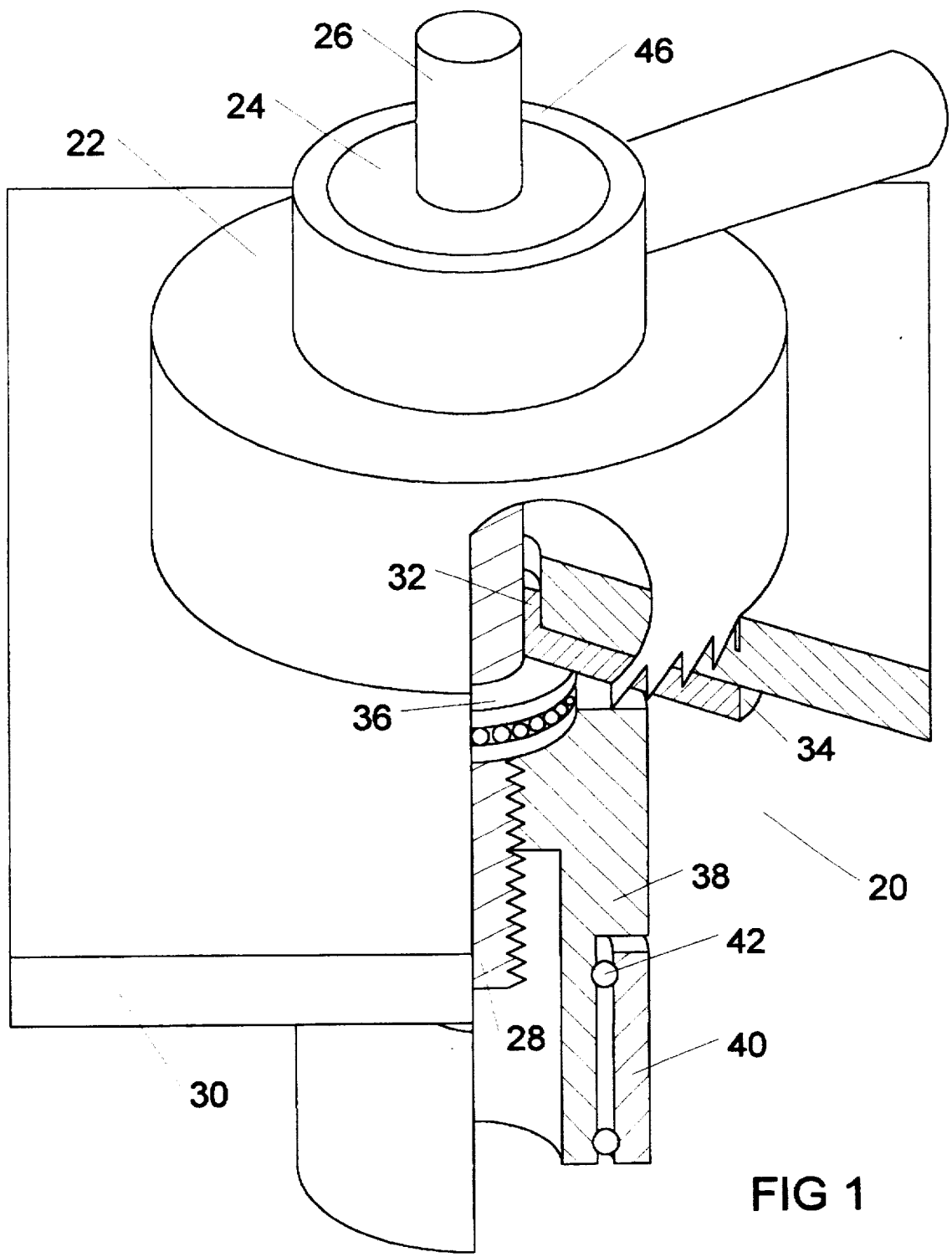
FIG. 1 is a perspective view of an embodiment of my invention with a draw bar thrust nut on the opposite side of the workpiece from the hole saw.

LIST OF REFERENCE NUMERALS 20 apparatus assembly
22 hole saw
24 arbor body
26 arbor shank
28 draw bar
30 workpiece
32 centering ring
34 backing plate
36 thrust bearing
38 thrust nut
40 thrust nut handle
42 handle bearing
44 draw bar anchor nut
46 ratchet handle
48 power drill
50 draw bar lever assembly
52 lever handle
54 cam
56 cam pivot point
58 bearing retainer 60 lever thrust bearing
62 draw bar nut

DESCRIPTION OF INVENTION/OPERATION OF INVENTION

All parts of my invention are made of steel or other suitably strong material. The draw bar assisted rotary hole sawing apparatus is capable of multi-method setup and allows user ingenuity in achieving a setup that meets the requirements of the job at hand.

FIG. 1—Description and Operation—FIG. 1 shows a perspective view of an embodiment of apparatus assembly 20. A thrust nut 38 is positioned on the opposite side of a workpiece 30 from a hole saw 22. Hole saw 22 is a commonly known and readily available rotary cutting tool, or any similar cutting tool, which is fastened to an arbor body 24 by any convenient method such as bolting with threaded fasteners. An optional arbor shank 26 may be attached to arbor body 24 by threaded fastening, welding or integral construction with arbor body 24. A commonly known and readily available ratchet handle 46 surrounds arbor body 24 and is used to apply rotational force to hole saw 22 to saw a hole in a workpiece 30. Arbor body 24 is shaped in a hex or other suitable shape to fit the commonly known ratchet handle 46. Arbor shank 26 is an alternative provision whereby hole saw 22 may be rotated with a power drill 48, or similar means, instead of the ratchet handle 46 option. Attached to arbor body 24 by threaded fastening, welding or integral construction is a draw bar 28 which is a threaded rod. Draw bar 28 passes thru a hole in workpiece 30. A backing plate 34 is positioned around draw bar 28 and against workpiece 30. Centering ring 32 is attached to backing plate 34 by press fit, welding, threaded fastening or integral construction, and slip fits into the hole in workpiece 30. A thrust bearing 36 is positioned against backing plate 34. Thrust bearings are commonly known and readily available. Thrust nut 38 is threaded onto draw bar 28, is cylindrical in shape, and may have a hex shape or flats to fit a wrench or be any other suitable shape for the application. A thrust nut handle 40 is a tubular sleeve with handle bearings 42 that are rotatably fitted over a portion of thrust nut 38.

The operation of the FIG. 1 embodiment of my invention is as follows. The assembled hole saw 22, arbor body 24, arbor shank 26 and draw bar 28 are positioned on workpiece 30 with draw bar 28 thru a hole in workpiece 30. Backing plate 34 with centering ring 32 is placed around draw bar 28 and against workpiece 30 with centering ring 32 in the hole in workpiece 30 to center draw bar 28 in the hole. Thrust bearing 36 is positioned around draw bar 28 and against backing plate 34 and is used as an anti-friction method to reduce the rotating friction of the machining operation. Thrust nut 38 is threaded onto draw bar 28 and is rotatingly tightened on the threaded draw bar 28 to place pressure between hole saw 22 and workpiece 30, to achieve the desired hole sawing operation. Thrust nut 38 may have a hex shape or flats such that a wrench may be used to tighten it. Its basic form is a cylindrical shape so that an operator's gloved hand, by a slipping friction grip on the cylindrical shape, may tighten thrust nut 38 as it rotates with draw bar 28 while performing the cutting operation. To achieve this result with a conventional direction of rotation hole saw 22, which is clockwise from the back of the hole saw, the draw bar 28 requires a right hand thread. The required thread pitch must be such that enough mechanical pressure can be introduced with the gloved hand slip friction grip on thrust nut 38 to force hole saw 22 into workpiece 30. However, the pitch used must be coarse enough that the thread of the rotating draw bar 28 will not screw itself into thrust nut 38 when no gloved hand friction is being applied. In some applications this requires commonly known multi-lead threads on draw bar 28 and thrust nut 38. Thrust nut handle 40 with included handle bearing 42 rotates freely around thrust nut 38 and provides a handle so that operator can readily push or pull against the axis of draw bar 28 to forcibly resist the secondary pressure introduced by the primary rotational forces that cause the axis of draw bar 28 to tilt from the required perpendicular relationship with workpiece 30. The rotational force that rotates hole saw 22 may be applied with hand or powered means. Hand means include commonly known devices such as braces, T-handles, and ratchet handles. Powered means include commonly known equipment such as electric, hydraulic or pneumatic power drills, power wrenches and power drives.

Figure 2:
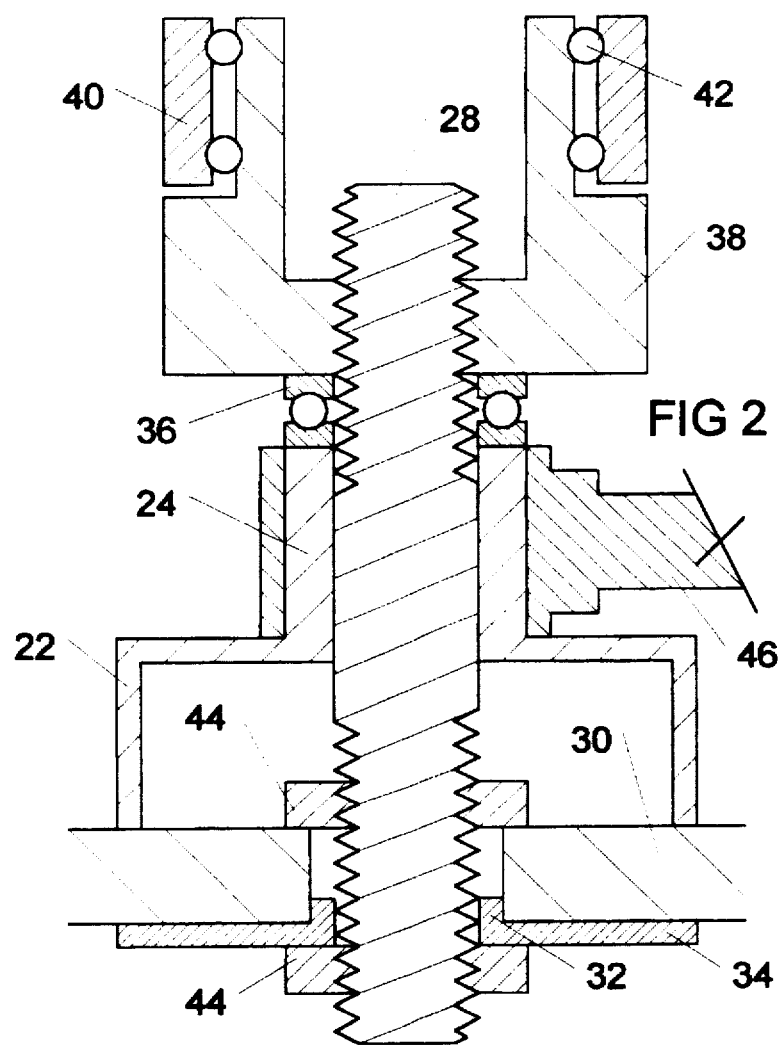
FIG. 2 is a side view of an embodiment of the invention with a non-rotating draw bar.

FIG. 2—Description and Operation—FIG. 2 is a side view of another embodiment of my invention and shows an apparatus assembly 20 with a non-rotating draw bar 28 and a thrust nut 38 located adjacent to a hole saw 22. As in FIG. 1 description, a hole saw 22 is fastened to an arbor body 24 which is shaped properly to be powered with a commonly known ratchet handle 46, or similar device. In this embodiment, draw bar 28 is not attached to arbor body 24 but passes thru a slip fit hole in arbor body 24. Draw bar 28 is secured to workpiece 30, backing plate 34, and centering ring 32, with draw bar anchor nuts 44. Backing plate 34 is used to support thin materials against the pressure of the rotating hole saw as well as to support the centering ring 32 and to provide support to hold draw bar 28 in its proper position. Hole saw 22, arbor body 24 and thrust bearing 36 are placed around draw bar 28 and against workpiece 30. Thrust nut 38 with thrust nut handle 40 and handle bearing 42, as described for FIG. 1, is threaded onto draw bar 28. Thrust nut 38 is tightened on draw bar 28 to place pressure between hole saw 22 and workpiece 30 to achieve required machining operation. Because the draw bar 28 does not rotate in this embodiment, the operator can not use the slip friction method as described in FIG. 1, but must simply tighten the thrust nut 38 as required to feed hole saw 22 into workpiece 30. Thrust nut handle 40 with associated handle bearing 42, as described in FIG. 1, is used to resist draw bar 28 axis tilt.

Figure 3:
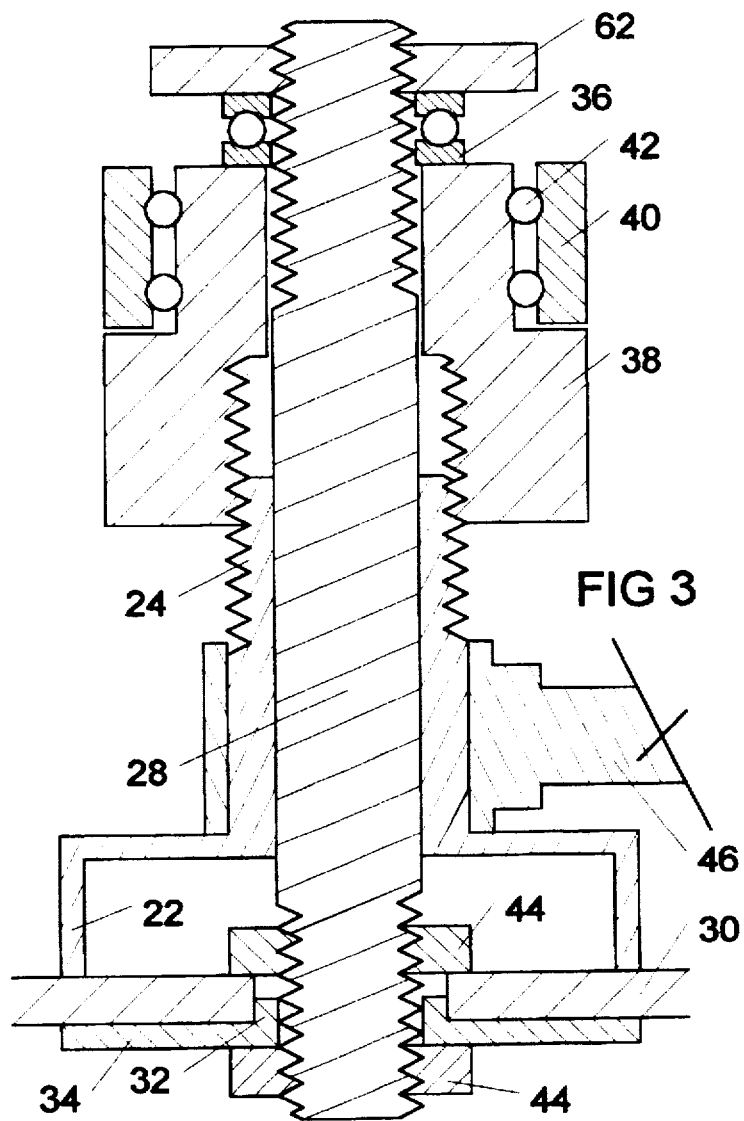
FIG. 3 is a side view of an embodiment of the invention with a non-rotating draw bar and a slip friction adjustable draw bar thrust nut.

FIG. 3—Description and Operation—FIG. 3 is a side view of another embodiment of my invention and shows a very similar apparatus to FIG. 2, but includes a method to utilize the slip friction adjustment of thrust nut 38 as described in FIG. 1. Thrust nut 38 includes a right hand thread of the type described in FIG. 1 that engages with a mating thread on arbor body 24. Thrust bearing 36 and draw bar nut 62 is placed on draw bar 28. An operator, by use of a slip friction grip, as described for FIG. 1, can increase pressure between hole saw 22 and workpiece 30 to produce the machining operation required as hole saw 22 rotates under power applied by ratchet handle 46 or other described method. As described for FIG. 1, the operator may forcibly resist the tilt of the axis of draw bar 28 with the thrust nut handle 40 provision.

Figure 4:
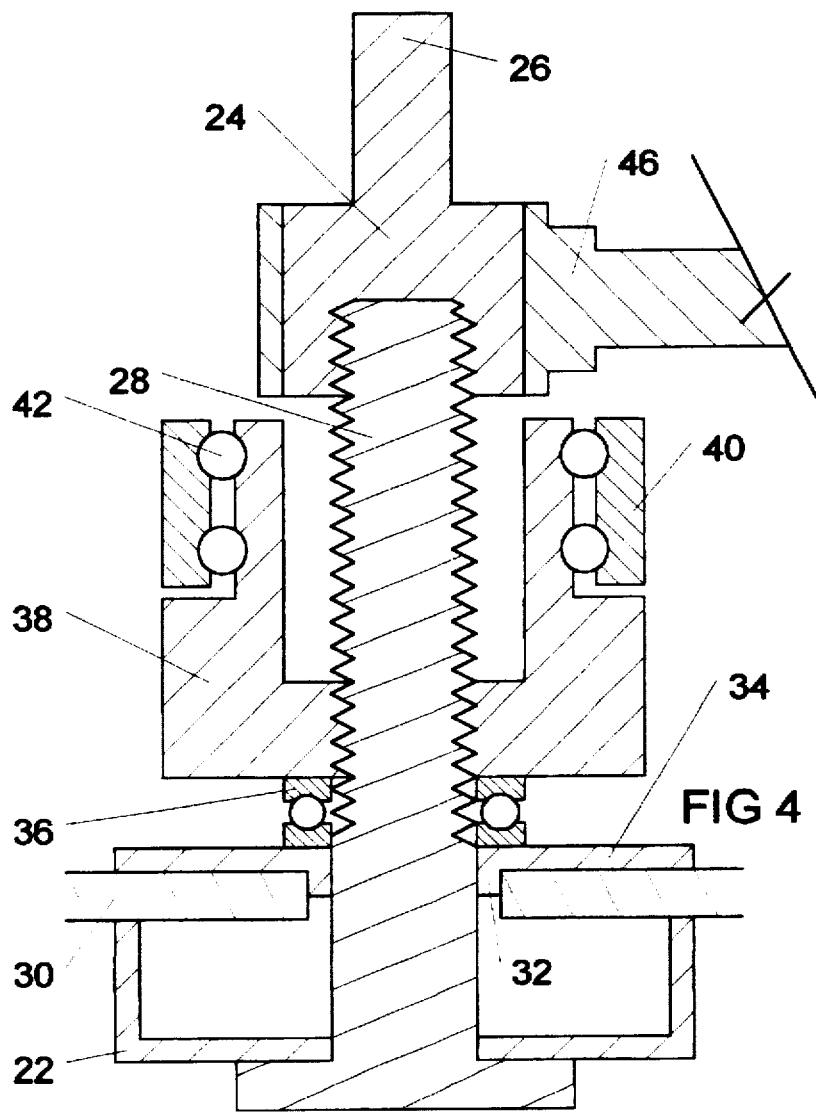
FIG. 4 is a side view of an embodiment of the invention with the hole saw on the opposite side of the workpiece from the draw bar thrust nut and the driven end of the apparatus.

FIG. 4—Description and Operation—FIG. 4 is a side view of another embodiment of my invention which shows a thrust nut 38 on the opposite side of a workpiece 30 from a hole saw 22. Hole saw 22 is rigidly attached to draw bar 28 by any functional means such as bolting, keying, etc. Draw bar 28 is positioned in a hole thru workpiece 30 with hole saw 22 against workpiece 30. Backing plate 34, centering ring 32 and thrust bearing 36, as described for FIG. 1, are positioned around draw bar 28 and against workpiece 30.

Thrust nut 38, as described for FIG. 1, is threaded onto draw bar 28. An arbor body 24 is threaded onto draw bar 28. Arbor body 24 as described for FIG. 1, is shaped to receive power from a commonly known ratchet handle 46 or similar method and device for applying rotary power to hole saw 22. Arbor shank 26 may be attached to arbor body 24, as described for FIG. 1, to provide for an alternative method to power hole saw 22 with a power drill or similar device as described for FIG. 1. A commonly available hole saw 22 will require a counter clockwise rotation in this embodiment, when viewed from the drive end of draw bar 28. Therefore, to use the slip friction adjustment method for thrust nut 38, as described in FIG. 1, the draw bar 28 and thrust nut 38 thread must be right handed, and the thread pitch as described for FIG. 1. The operator, by using a slip friction grip on thrust nut 38 may quickly and conveniently increase pressure to pull the hole saw 22 into workpiece 30 and may also use thrust nut handle 40 to forcibly resist the tilt of draw bar 28 if rotational force is applied by a method that causes draw bar 28 to tilt.

FIGS. 5 and 6—Description and Operation—FIGS. 5 and 6 are top and side views of a draw bar lever assembly 50 of my invention. They show a lever thrust bearing 60, of a type commonly known and available, which is press fitted into a bearing retainer 58. Bearing retainer 58 also has two holes, cam pivot points 56, which are facing each other, and are at right angle to the axis of lever thrust bearing 60. Inserted thru these two cam pivot point 56 holes are two cams 54. The cams 54 are securely fastened to lever handle 52 by welding or similar means. Draw bar lever assembly 50 is used as an alternative method to apply a readily variable pressure to forcibly press hole saw 22 against workpiece 30 to perform required machining operation. The description and operation of FIG. 7 will detail how this is accomplished as well as how the draw bar lever assembly 50 can also be used to forcibly resist the tilt of the axis of draw bar 28 as described for FIG. 1. Draw bar lever assembly 50 can be used at either end of draw bar 28, adjacent to hole saw 22 or on the side of workpiece 30 opposite of hole saw 22.

FIG. 7—Descripton and Operation—FIG. 7 is a side view of an embodiment of my invention using draw bar lever assembly 50 to force hole saw 22 against workpiece 30. The description and operation are identical to FIG. 2 with the exception that thrust nut 38 is replaced with draw bar lever assembly 50 and a draw bar nut 62 is threaded onto draw bar 28. The hole in lever thrust bearing 60 of draw bar lever assembly 50 is placed around draw bar 28. The operator then tightens draw bar nut 62 snuggly against cam 54, and by rotating the cams by moving lever handle 52, the hole saw 22 is forced against workpiece 30 to perform the desired machining operation. The operator, by applying pressure to lever handle 52 while lever handle 52 is in the required orientation to the apparatus assembly 20 will also, at the same time as pressure is applied to the hole saw 22, be applying pressure to forcibly resist the tilt of draw bar 28 from side pressure against it as a result of secondary forces produced by the primary rotational forces applied to hole saw 22.

CONCLUSION, RAMIFICATIONS, AND SCOPE OF INVENTION

Thus the reader will see that the draw bar assisted rotary hole sawing apparatus of the invention provides a compact, versatile, inexpensive to manufacture, apparatus that provides a convenient way to achieve hole sawing and similar types of machining operations. There is great need in industries such as construction, maintenance and assembly for multi-method setup capable apparatus for portable machining operations.

While my above description contains many specificities, these should not be construed as limitations on the scope of the invention, but rather as an exemplification of preferred embodiments thereof. There are many other variations and considerations. For example: 1) User may assemble the various pieces of the invention in a different way than shown to achieve a setup for certain job requirements. 2) When the setup uses a non-rotating draw bar, the slip friction hand grip method of tightening the thrust nut will not work for all embodiments shown, and the nut must be rotated by hand or with a wrench or similar device to force the cutting tool against the work. 3) The thread on the draw bar and in the thrust nut may be right or left handed as required and of the proper pitch as described. 4) The centering ring and backing plate provision centers the draw bar in the workpiece hole, helps stabilize the draw bar, supports thin material hole sawing and also makes provision for successful setup even in the event that the workpiece is thick and the workpiece hole is not perpendicular to the workpiece surface. 5) The multi-method setup capable design of the invention allows the draw bar thrust nut to be positioned at either end of the draw bar relative to the hole saw and power input location. 6) The slip friction thrust nut provision may be used in conjunction with the draw bar lever in place of the draw bar nut, as described. 7) A spring may be inserted between the thrust nut and the thrust bearing, or between the draw bar lever assembly and the cutting tool to provide a uniform pressure and a self feed capability. The spring must be of the appropriate stength to provide the proper cutting pressure for the application. Too great a pressure will cause the cutter to dig into the workpiece and stick or break. A spring of too little strength will result in slow cutting action, or will allow the tool to slip and thus damage the teeth of the cutter. 8) The draw bar lever assembly may be designed in numerous other ways than shown. It may have a fulcrum point that is positioned against the workpiece or against the backing plate. Many other designs are possible that will produce pressure between the thrust nut or draw bar nut and the cutting tool, to force the cutting tool against the workpiece. Accordingly, the scope of the invention should be determined not by the embodiments illustrated, but by the appended claims and their legal equivalent.

I claim:

1. A rotary hole sawing apparatus for making a larger hole in a workpiece already having a pilot hole concentric with the desired location of the larger hole, comprising an externally threaded drawbar which is placed concentrically within said pilot hole, said drawbar having a longitudinal axis, a hole saw mounted on said drawbar on one side of the workpiece, means for rotating said hole saw, a thrust nut which is threaded onto said drawbar, and a thrust nut handle mounted on said thrust nut for rotation about the axis of the drawbar independent of said thrust nut.

2. The rotary hole sawing apparatus of claim 1, wherein said thrust nut is located on the same side of the workpiece as the hole saw.

3. The rotary hole sawing apparatus of claim 2, further comprising a thrust bearing located between said hole saw and thrust nut.

4. The rotary hole sawing apparatus of claim 2, further comprising a drawbar nut threaded to the end of drawbar on the same side as the hole saw and thrust nut, a thrust bearing located between said drawbar nut and thrust nut, said thrust nut and hole saw being connected together by threads.

5. The rotary hole sawing apparatus of claim 1, wherein said thrust nut is located on the opposite side of the workpiece from the hole saw.

6. The rotary hole sawing apparatus of claim 5, further comprising a backing plate mounted on said drawbar on the opposite side of the workpiece from said hole saw.

7. The rotary hole sawing apparatus of claim 6, further comprising a thrust bearing located between said backing plate and thrust nut.

8. The rotary hole sawing apparatus of claim 7, wherein said means for rotating the hole saw is on the same side of the workpiece as the thrust nut and backing plate.

* * * * *